US012759492B2

(12) United States Patent
Hutchins et al.

(10) Patent No.: US 12,759,492 B2
(45) Date of Patent: Oct. 13, 2026

(54) FLUIDIC CONNECTION INCLUDING A PADLOCK CONNECTION MECHANISM FOR AN ANODE WATER SEPARATOR DRAIN MODULE

(71) Applicant: GM GLOBAL TECHNOLOGY OPERATIONS LLC, Detroit, MI (US)

(72) Inventors: Calvin K. Hutchins, Clawson, MI (US); Phani Krishna Nathani, Bengaluru (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/044,324

(22) Filed: Feb. 3, 2025

(65) Prior Publication Data

US 2026/0225551 A1 Aug. 6, 2026

(51) Int. Cl.
*B60R 16/08* (2006.01)
*F16L 33/30* (2006.01)
*H01M 8/04119* (2016.01)

(52) U.S. Cl.
CPC .............. *B60R 16/08* (2013.01); *F16L 33/30* (2013.01); *H01M 8/04156* (2013.01); *H01M 2250/20* (2013.01)

(58) Field of Classification Search
CPC ..... H01M 8/04156; B60R 16/08; F16L 33/22; F16L 33/32; F16L 31/00; F16L 31/02; F16L 35/00; F16L 35/005; F16L 47/26; F16L 41/02; F16L 41/021; F16L 41/023; F16L 41/03; F16L 41/086; F16L 41/12; F16L 43/00; F16L 43/003; F16L 43/001; F16L 43/02
See application file for complete search history.

(56) References Cited

U.S. PATENT DOCUMENTS 5,261,608 A * 11/1993 Hatzis ..................... F02C 7/222
239/600

* cited by examiner

*Primary Examiner* — Aaron M Dunwoody

(57) ABSTRACT

A fluidic connection includes a first member including a first fluid passage and a first mounting member. The first fluid passage extends along a first axis, and the first mounting member is arranged alongside and spaced from the first fluid passage along a second axis. The first mounting member includes a first fastener passage that extends along a third axis that is distinct from the first and second axes. A second member includes a second fluid passage and second mounting member. The second fluid passage includes a first passage portion extending along the first axis and a second passage portion extending along a fourth axis that is distinct from the first axis. The second mounting member includes a second fastener passage that extends along the third axis. The second fastener passage is aligned with the first fastener passage when the second passage portion is connected with the first fluid passage.

20 Claims, 7 Drawing Sheets

FLUIDIC CONNECTION INCLUDING A PADLOCK CONNECTION MECHANISM FOR AN ANODE WATER SEPARATOR DRAIN MODULE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to the art of fluidic connections and, more particularly to a fluidic connection including a padlock connection mechanism.

Many fluidic connections include a first member or hose that is fitted over a second member or hose bib. A clamp is positioned around the hose and tightened. The clamp compresses the hose onto the hose bib. Access to the clamp is necessary in order to secure the connection. In other arrangements, a connector having a bib is connected to an opening in a substrate. The connector includes a flange having openings. The bib extends perpendicularly from the flange. Fasteners are passed through the openings into the substrate. As such, access to the substrate to which the flange is attached is required to secure the connection.

SUMMARY

A system including a fluidic connection, in accordance with the present disclosure includes a first member including a first fluid passage and a first mounting member. The first fluid passage extends along a first axis, and the first mounting member is arranged alongside and spaced from the first fluid passage along a second axis distinct from the first axis. The first mounting member includes a first fastener passage that extends along a third axis that is distinct from the first axis and the second axis. A second member includes a second fluid passage and second mounting member. The second fluid passage includes a first passage portion extending along the first axis and a second passage portion extending along a fourth axis that is distinct from the first axis. The second mounting member includes a second fastener passage that extends along the third axis. The second fastener passage is aligned with the first fastener passage when the second passage portion is fluidically connected with the first fluid passage.

In other features, the first fluid passage includes a terminal end, the first fastener passage being spaced from the terminal end along the first axis.

In other features, a step is defined between the first mounting member and the first fluid passage.

In other features, the first mounting member includes a first wall portion and a second wall portion spaced from the first wall portion by a gap having a first dimension, the first fastener passage including a first fastener passage portion formed in the first wall portion and a second fastener passage portion formed in the second wall portion.

In other features, the second mounting member defines a tab having a second dimension that is smaller than the first dimension, the second mounting member being configured to reside in the gap between the first wall portion and the second wall portion when the second fluid passage is fluidically connected with the first fluid passage.

In other features, a fastener passes through the first wall portion, the second wall portion and the tab to secure the second member to the first member.

In other features, the second fastener passage portion in the second wall portion includes a plurality of threads configured to engage with the fastener.

In other features, the first mounting member includes a first wall portion including the first fastener passage and the second mounting member includes a tab including the second fastener passage, the first fastener passage being aligned with the second fastener passage with the first fluid passage is coupled with the second fluid passage.

In other features, the first fastener passage includes a plurality of threads configured to engage with a fastener.

In other features, the second fluid passage comprises a nipple including an O-ring configured to nest within the first fluid passage.

A method of creating a fluidic connection, in accordance with the present disclosure, includes inserting a first fluid passage of a first member into a first fluid passage portion of a second fluid passage of a second member. The first fluid passage and the first fluid passage portion extend along a first axis. The second fluid passage includes a second passage portion that extends along a second axis that is distinct from the first axis. A first fastener passage formed in a first mounting member of the first member is aligned with a second fastener passage formed in a second mounting member of the second member.

In other features, a fastener is passed along a third axis through the first fastener passage and the second fastener passage, the fastener is secured to one of the first mounting member and the second mounting member.

In other features, aligning the first fastener passage with the second fastener passage includes inserting a tab including the second fastener passage into a gap defined between a first wall portion having a first fastener passage portion and a second wall portion having a second fastener passage portion, the first fastener passage portion and the second fastener passage portion forming the first fastener passage.

In other features, securing the fastener includes engaging a first plurality of threads on the fastener with a second plurality of threads provided in the second fastener passage portion.

In other features, engaging the first plurality of threads on the fastener with the second plurality of threads includes threading the first plurality of threads into a threaded bushing.

In other features, passing the fastener along the third axis through the first fastener passage and the second fastener passage includes supporting the fastener with a bushing installed in the first fastener passage portion.

In other features, aligning the first fastener passage with the second fastener passage includes positioning a tab of the second member against a first wall portion of the first member.

In other features, aligning the first fastener passage with the second fastener passage includes seating the second fluid passage in the first fluid passage.

In other features, seating the second fluid passage in the first fluid passage includes passing a nipple including an O-ring into the first fluid passage, the O-ring forming a seal against the first member.

In other features, passing the fastener through the first fastener passage and the second fastener passage includes guiding the fastener along an axis that is substantially perpendicular relative to the first axis.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Modern motor compartments are cramped. Many systems are crowded into smaller spaces. Connecting hoses or other connections to a component typically requires space at the connection to manipulate the hose and or secure the flange. Tools also require space to manipulate fasteners. Often times, it is desirable to lower a component into a tight space to make the connection. In such cases, access to the connection point may be difficult. It would be desirable to form a connection that may be made along a first or connection axis with fasteners being installed along a second or clamping axis that is distinct from the connection axis, in order to provide greater access for securing a connection.

Figure 1:
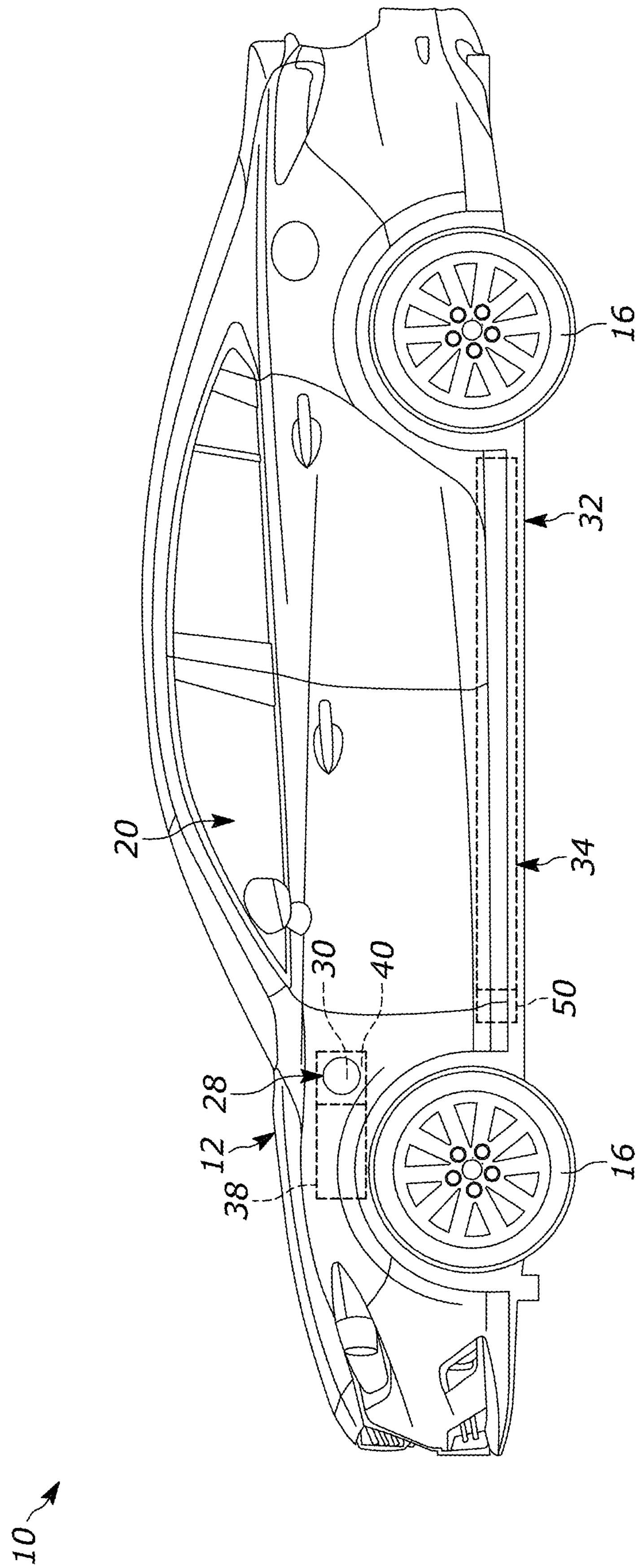
FIG. 1 is a left side view of a vehicle including an anode water separated drain module, in accordance with the present disclosure.

A vehicle, in accordance with a non-limiting example, is indicated generally at 10 in FIG. 1. Vehicle 10 includes a body 12 supported on a plurality of wheels, two of which are indicated at 16. Body 12 defines, in part, a passenger compartment 20. Body 12 includes a charge port cover 28 that houses a charge port 30. Vehicle 10 includes a chassis 32 that supports body 12. Chassis 32 also supports a fuel cell 34 electrically connected to charge port 30. Chassis 32 is further shown to support a motor 38 that is electrically connected to fuel cell 34 and a drivetrain 40. Drivetrain 40 transfers motive power from motor 38 to one or more of the plurality of wheels 16. Fuel cell 34 includes an anode (not shown) that interacts with hydrogen and a cathode (also not shown) which interacts with oxygen to produce electricity that powers motor 38. A byproduct of the interaction in fuel cell 34 between the hydrogen and oxygen is water.

Figure 2:
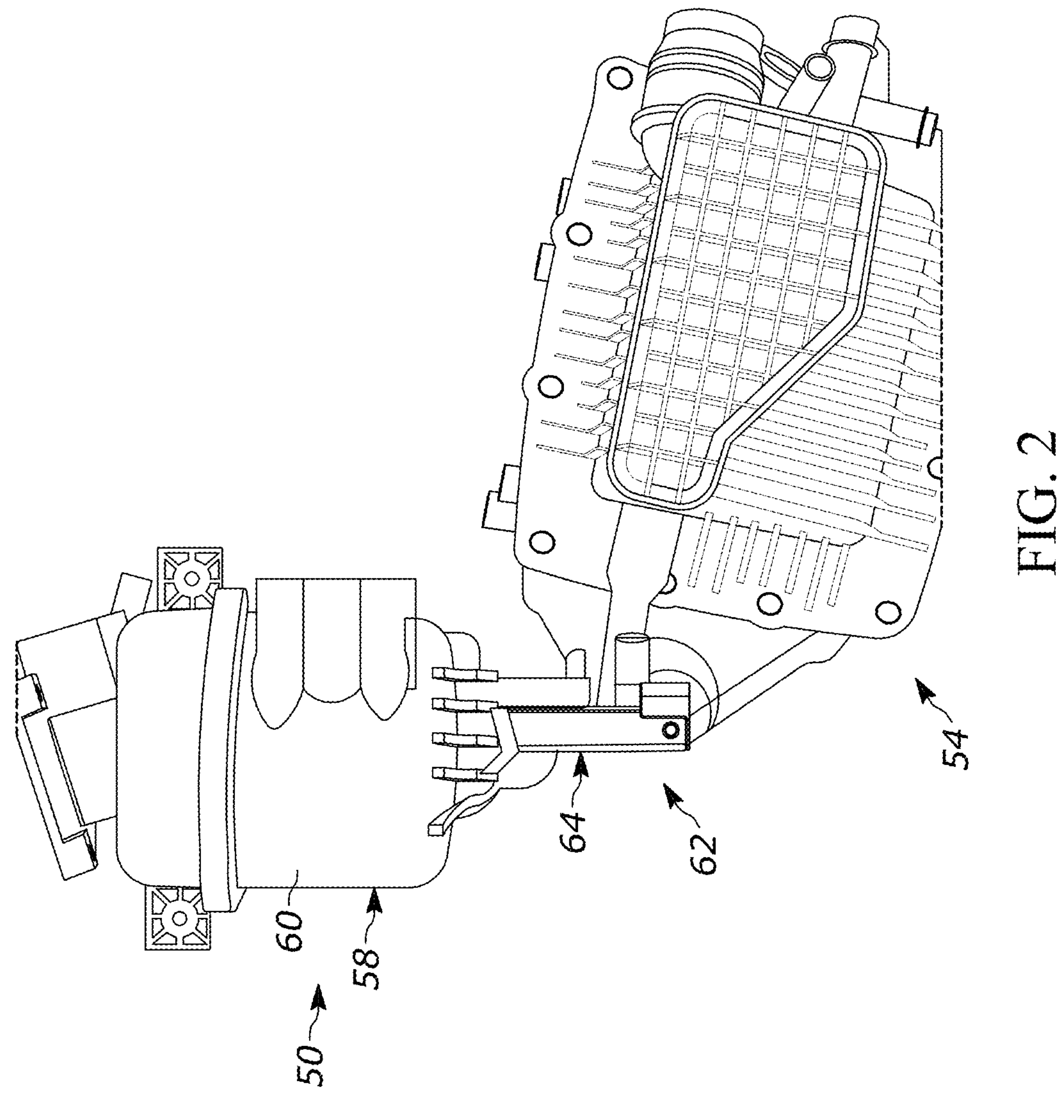
FIG. 2 is a perspective view of the anode water separator drain module including a first member having a first fluid passage and a second member including a second fluid passage fluidically connected to the first fluid passage, in accordance with the present disclosure.

In accordance with a non-limiting example illustrated in FIG. 2, an anode water separator 50 is connected to fuel cell 34. Anode water separator 50 accepts and separates out water that may develop in fuel cell 34. The water is passed to a drain manifold 54 where it may be stored, released, and/or dissipated through the application of heat. The management of water enhances an overall operational efficiency of fuel cell 34. Anode water separator 50 includes a first member 58 that defines a separation portion 60 and a second member 62 that defines a drain module 64.

As will be detailed more fully herein, drain module 64 is coupled to separation portion 60 through a padlock connection mechanism 68. The phrase "padlock connection mechanism" simply describes the arrangement of components that form the interface between first member 58 and second member 62. The arrangement of components allows technicians to establish the fluidic connection between separation portion 60 and drain module 64 in tight spaces with difficult access from above and below. While described as facilitating a fluidic connection between separation portion 60 and drain module 64, the padlock connection mechanism 68, in accordance with the present disclosure, may be used in a wide array of environments.

Figure 3:
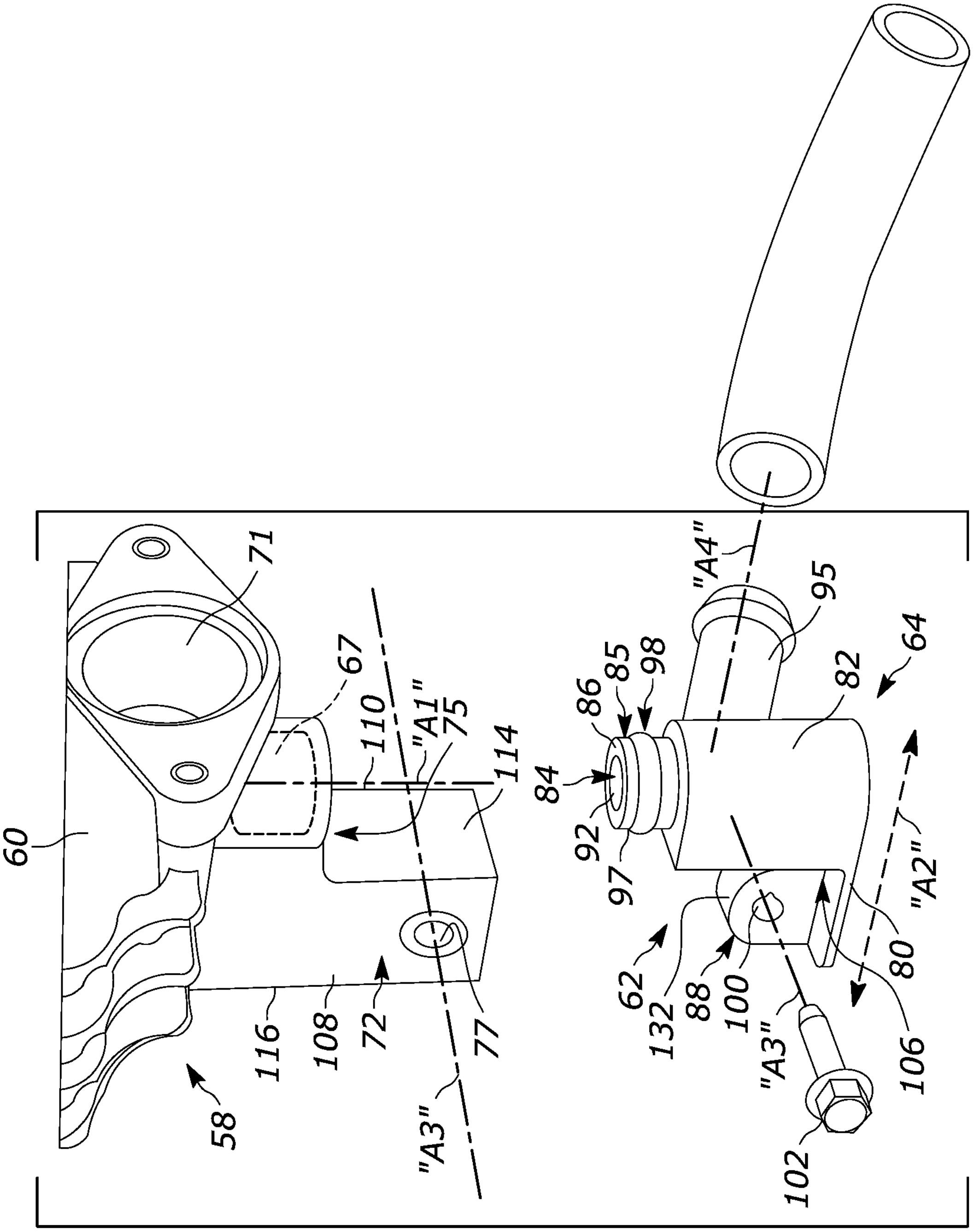
FIG. 3 is a disassembled view of the first member and the second member of the anode water separator drain module of FIG. 2, in accordance with the present disclosure.

Referring to FIG. 3, in a non-limiting example, first member 58 includes a first fluid passage 67 that extends along a first axis "A1". First member 58 also includes an inlet 71 that receives fluid to be separated from fuel cell 34. First member 58 is further shown to include a first mounting member 72 that is arranged alongside and spaced from first fluid passage 67 along a second axis "A2" forming a first step 75. First mounting member 72 includes a first fastener passage 77 that extends along a third axis "A3".

In accordance with the present disclosure, second member 62 includes a base 80 supporting a passage housing 82. A second fluid passage 84 is formed in passage housing 82. Second fluid passage 84 includes a nipple 85 that extends from passage housing 82. Nipple 85 includes a terminal end 86. Second member 62 also includes a second mounting member 88. In accordance with an aspect of the present disclosure, second fluid passage 84 includes a first passage portion 92 defined by nipple 85 and a second passage portion 95 that defines an outlet (not separately labeled) fluidically connected to drain manifold 54. Second passage portion 95 extends along a fourth axis "A4" that is distinct from the first axis "A1", the second axis "A2", and the third axis "A3".

First passage portion 92, when connected to first fluid passage 67, extends along the first axis "A1". First passage portion 92 is further shown to include an O-ring groove 97 that supports an O-ring 98. O-ring 98 seals against internal surfaces (not separately labeled) of first fluid passage 67. As further shown in FIG. 3, second mounting member 88 includes a second fastener passage 100 that is configured to align with first fastener passage 77 when second member 62 is joined with first member 58 and thus extend along the third axis A3.

A fastener 102 is passed through first fastener passage 77 and second fastener passage 100 to secure and fluidically connect second member 62 to first member 58. In accordance with an exemplary aspect, second member 62 includes a second step 106 defined between a second mounting member 88 and passage housing 82. Second step 106 that nests with first step 75 when second member 62 is joined to first member 58.

Figure 4:
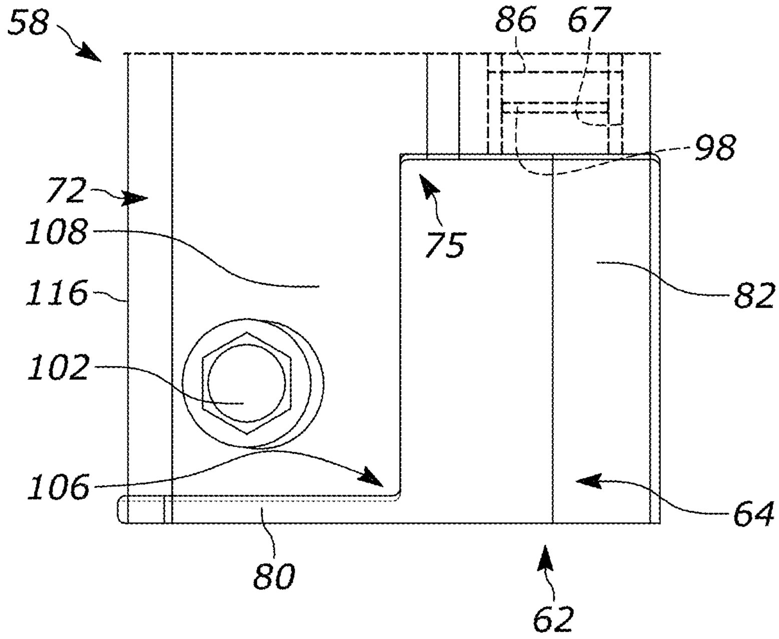
FIG. 4 depicts the first member fluidically connected to the second member of the anode water separator drain module, in accordance with the present disclosure.
Figure 5:
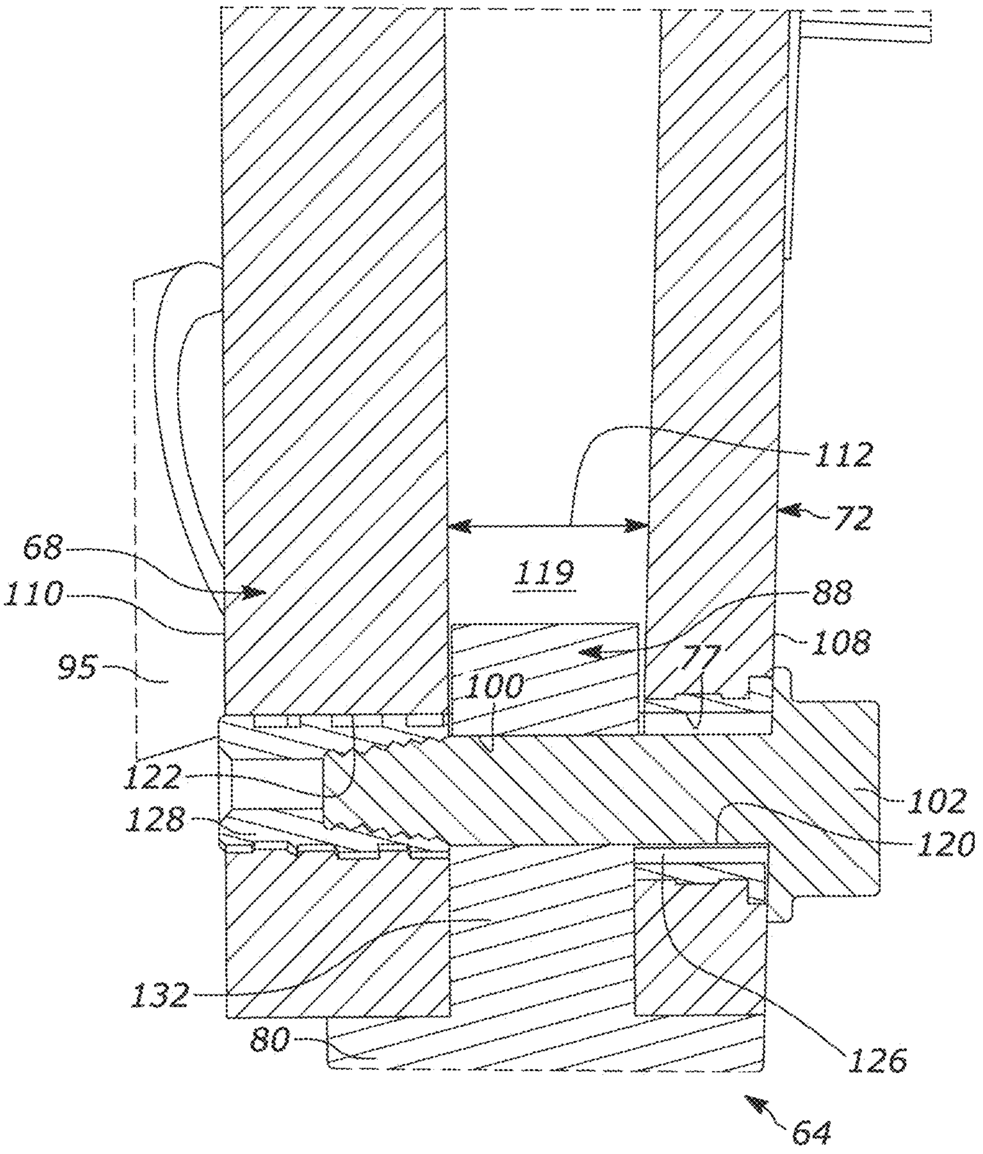
FIG. 5 is a cross-sectional view of the first member and second member of FIG. 4, in accordance with the present disclosure.

Reference will now follow to FIGS. 4 and 5 with continued reference to FIG. 3 in describing a connection between first member 58 and second member 62 in accordance with an exemplary aspect. First mounting member 72 includes a first wall portion 108, a second wall portion 110 spaced from first wall portion 108 by a gap 112. First mounting member 72 also includes a third wall portion 114 and a fourth wall portion 116. Third wall portion 114 and fourth wall portion 116 extend between and connect with first wall portion 108 and second wall portion 110. Gap 112 defines a passage 119 that extends through first mounting member 72 substantially parallel to the first axis A1.

In a non-limiting example, first fastener passage 77 includes a first fastener passage portion 120 formed in first wall portion 108 and a second fastener passage portion 122 formed in second wall portion 110. First fastener passage portion 120 is aligned with second fastener passage portion 122 along the third axis A3. First fastener passage portion 120 includes a bushing 126 that provides structural support for fastener 102. Second fastener passage portion 122 includes a threaded insert 128 that engages with threads (not separately labeled) on fastener 102.

Second mounting member 88 is shown in the form of a tab 132 that includes second fastener passage 100. Tab 132 is sized to nest between first wall portion 108 and second wall portion 110 as shown in FIG. 5. Tab 132 also sized to reside between third wall portion 114 and fourth wall portion 116. Fastener 102 may then be inserted through first fastener passage 77 and second fastener passage 100 to secure first member 58 to second member 62 in a manner similar to a padlock shackle passing through a hasp. In this manner, first member 58 is secured to second member 62 through a side facing portion of anode water separator 50.

That is, instead of circular clamps and flanges that require a specific access orientation, after tab 132 is introduced between first wall portion 108 and second wall portion 110 fastener 102 may pass through first fastener passage portion 120, through second fastener passage 100 and engage with threaded insert 128 in second fastener passage portion 122 to secure second member 62 to first member 58. In this manner, first member 58 may be lowered onto second member 62 and connected with fastener 102 without requiring access from above or below. Fastener 102 may be inserted from a side of anode water separator 50. which has greater access to technicians.

Figure 6:
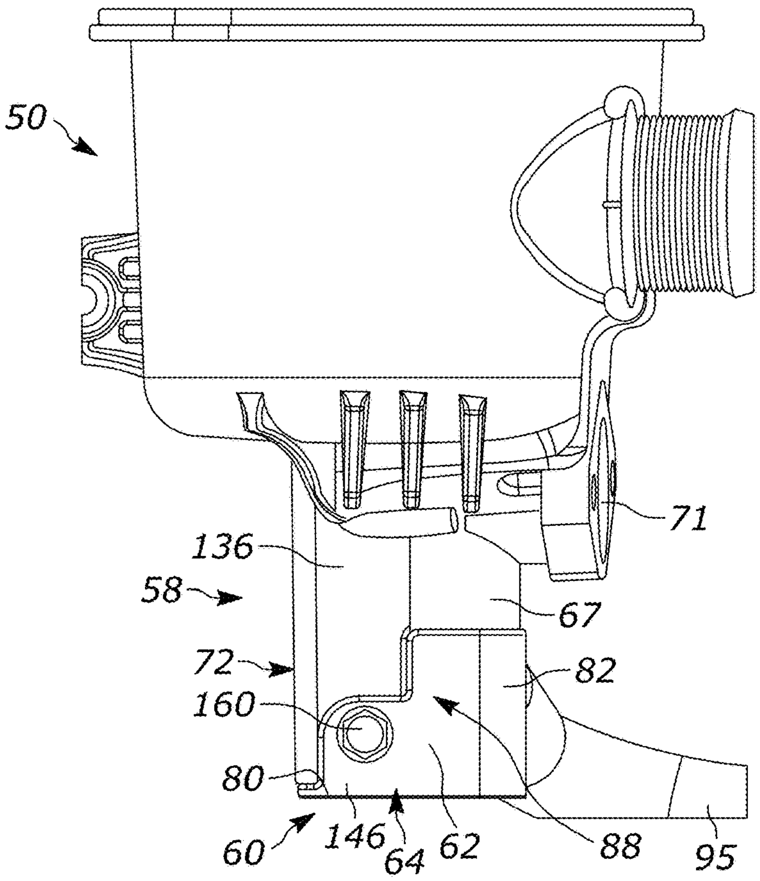
FIG. 6 depicts an anode water separator drain module, in accordance with another aspect of the present disclosure.
Figure 7:
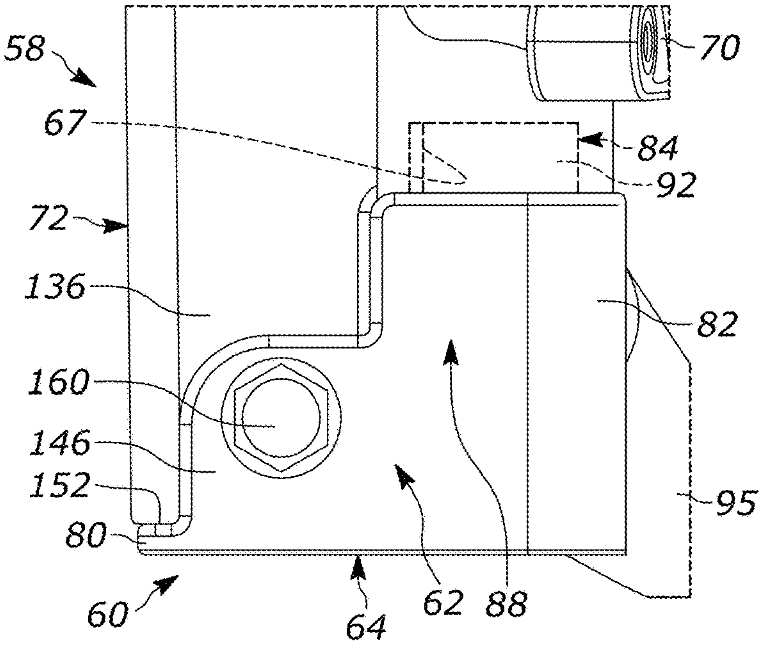
FIG. 7 depicts the first member fluidically connected to the second member of the anode water separator drain module of FIG. 6, in accordance with the present disclosure.
Figure 8:
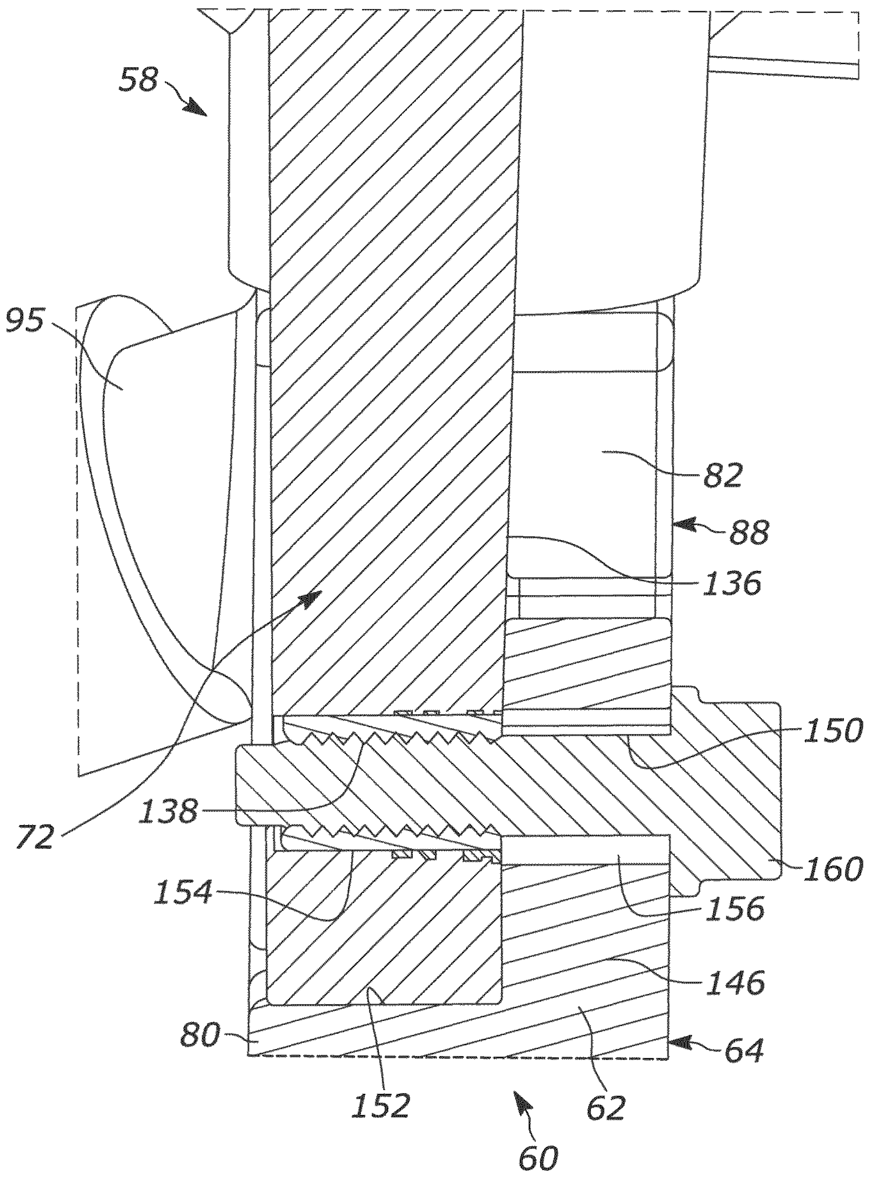
FIG. 8 is a cross-sectional view of the first member and the second member of FIG. 7, in accordance with the present disclosure.

Reference will now follow to FIGS. 6, 7, and 8 in describing a second connection arrangement for joining first member 58 and second member 62 without requiring access from above and/or below. First mounting member 72 includes a first wall portion 136 including a first fastener passage 138 and second mounting member 88 is defined by a tab 146 that projects outward from base 80. Tab 146 includes a second fastener passage 150.

In accordance with an exemplary aspect, base 80 is shown to include a support surface 152 that may be engaged by first mounting member 72 as shown in FIG. 8. In a manner similar to that discussed herein, first fastener passage 138 in first mounting member 72 includes a threaded insert 154. Second fastener passage 150 includes a bushing 156 that supports a fastener 160.

In accordance with a non-limiting example, first member 58 may be lowered onto second member 62 with first mounting member 72 engaging support surface 152 of base 80. At this point, first fastener passage 138 is aligned with second fastener passage 150 and second fluid passage 84 extends into first fluid passage 67. Fastener 160 may then be inserted into second fastener passage 150, passed into first fastener passage 138 and engaged with threaded insert 154 to secure first member 58 to second member 62. In a manner similar to that discussed, fastener 160 is passed through second fastener passage and into first fastener passage 138 in a manner similar to a padlock shackle through a hasp to avoid the need to access anode water separator 50 from above or below to establish the connection between first member 58 and second member 62.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

The terms "about" and "substantially" are intended to include the degree of error associated with measurement of the particular quantity based upon the equipment available at the time of filing the application. For example, "about" and "substantially" can include a range of ±8% of a given value.

What is claimed is:

1. A system including a fluidic connection comprising:

a first member including a first fluid passage and a first mounting member, the first fluid passage extending along a first axis, and the first mounting member being arranged alongside and spaced from the first fluid passage along a second axis distinct from the first axis, the first mounting member including a first fastener passage that extends along a third axis that is distinct from the first axis and the second axis; and a second member including a second fluid passage and second mounting member, the second fluid passage including a first passage portion aligned with the first axis and a second passage portion extending along a fourth axis that is distinct from the first axis, the second mounting member including a second fastener passage that extends along the third axis that is substantially perpendicular relative to the first axis and the second axis, the second fastener passage being aligned with the first fastener passage when the first passage portion is received by and in fluid communication with the first fluid passage.

2. The system according to claim 1, wherein the first fluid passage includes a terminal end, the first fastener passage being spaced from the terminal end along the first axis.

3. The system according to claim 2, further comprising a step defined between the first mounting member and the first fluid passage.

4. The system according to claim 1, wherein the first mounting member includes a first wall portion and a second wall portion spaced from the first wall portion by a gap having a first dimension, the first fastener passage including a first fastener passage portion formed in the first wall portion and a second fastener passage portion formed in the second wall portion.

5. The system according to claim 4, wherein the second mounting member defines a tab having a second dimension that is smaller than the first dimension, the second mounting member being configured to reside in the gap between the first wall portion and the second wall portion when the second fluid passage is fluidically connected with the first fluid passage.

6. The system according to claim 5, further comprising a fastener passing through the first wall portion, the second wall portion and the tab to secure the second member to the first member.

7. The system according to claim 1, wherein the first mounting member includes a first wall portion including the first fastener passage and the second mounting member includes a tab including the second fastener passage, the first fastener passage being aligned with the second fastener passage with the first fluid passage is coupled with the second fluid passage.

8. The system according to claim 7, wherein the first fastener passage includes a plurality of threads configured to engage with a fastener.

9. The system according to claim 1, wherein the second fluid passage comprises a nipple including an O-ring configured to nest within the first fluid passage.

10. A method of creating a fluidic connection comprising:

inserting a first fluid passage portion of a second fluid passage of a second member into a first fluid passage of a first member, the first fluid passage and the first fluid passage portion extending along a first axis, the second fluid passage including a second passage portion that extends along a second axis that is distinct from the first axis; and aligning a first fastener passage formed in a first mounting member of the first member with a second fastener passage formed in a second mounting member of the second member;

passing a fastener along a third axis through the first fastener passage and the second fastener passage; and securing the fastener to one of the first mounting member and the second mounting member, wherein aligning the first fastener passage with the second fastener passage includes inserting a tab including the second fastener passage into a gap defined between a first wall portion having a first fastener passage portion and a second wall portion having a second fastener passage portion, the first fastener passage portion and the second fastener passage portion forming the first fastener passage.

11. The method of claim 10, wherein securing the fastener includes engaging a first plurality of threads on the fastener with a second plurality of threads provided in the second fastener passage portion.

12. The method of claim 11, wherein engaging the first plurality of threads on the fastener with the second plurality of threads includes threading the first plurality of threads into a threaded bushing.

13. The method of claim 11, wherein passing the fastener along the third axis through the first fastener passage and the second fastener passage includes supporting the fastener with a bushing installed in the first fastener passage portion.

14. The method of claim 10, wherein aligning the first fastener passage with the second fastener passage includes positioning a tab of the second member against a first wall portion of the first member.

15. The method of claim 10, wherein aligning the first fastener passage with the second fastener passage includes seating the second fluid passage in the first fluid passage.

16. The method of claim 15, wherein seating the second fluid passage in the first fluid passage includes passing a nipple including an O-ring into the first fluid passage, the O-ring forming a seal against the first member.

17. The method of claim 10, wherein passing the fastener through the first fastener passage and the second fastener passage includes guiding the fastener along an axis that is substantially perpendicular relative to the first axis.

18. A vehicle comprising:

a body defining a passenger compartment;

a motor supported in the body; and a padlock connection mechanism for establishing a fluidic connection in the vehicle, the padlock connection mechanism comprising:

a first vehicle member including a first fluid passage and a first mounting member, the first fluid passage extending along a first axis, and the first mounting member being arranged alongside and spaced from the first fluid passage along a second axis distinct from the first axis, the first mounting member including a first fastener passage that extends along a third axis that is distinct from the first axis and the second axis; and a second vehicle member including a second fluid passage and second mounting member, the second fluid passage including a first passage portion aligned with the first axis and a second passage portion extending along a fourth axis that is distinct from the first axis the second mounting member including a second fastener passage that extends along the third axis, that is substantially perpendicular relative to the first axis and the second axis, the second fastener passage being aligned with the first fastener passage when the first passage portion is received by and in fluid communication with the first fluid passage.

19. The vehicle according to claim 18, wherein the first fluid passage includes a terminal end, the first fastener passage being spaced from the terminal end along the first axis.

20. The vehicle according to claim 19, further comprising a step defined between the first mounting member and the first fluid passage.

* * * * *